US012508588B2

(12) United States Patent
Chang et al.

(10) Patent No.: US 12,508,588 B2
(45) Date of Patent: Dec. 30, 2025

(54) BIOMECHANICAL TESTING SYSTEM AND REACTOR MODULE THEREOF

(71) Applicant: Sheng-Chih Chang, Kaohsiung (TW)

(72) Inventors: Sheng-Chih Chang, Kaohsiung (TW); Jeng-Long Hsieh, Kaohsiung (TW)

(73) Assignee: Sheng-Chih Chang, Kaohsiung (TW)

( * ) Notice: Subject to any disclaimer, the term of this patent is extended or adjusted under 35 U.S.C. 154(b) by 901 days.

(21) Appl. No.: 17/698,783

(22) Filed: Mar. 18, 2022

(65) Prior Publication Data

US 2023/0311117 A1 Oct. 5, 2023

(51) Int. Cl.
*B01L 1/00* (2006.01)
*B01L 3/00* (2006.01)
*B01L 7/00* (2006.01)

(52) U.S. Cl.
CPC ..... *B01L 3/502715* (2013.01); *B01L 3/50273* (2013.01); *B01L 3/502746* (2013.01); *B01L 3/502761* (2013.01); *B01L 7/00* (2013.01); *B01L 2200/0647* (2013.01); *B01L 2200/0689* (2013.01); *B01L 2300/0645* (2013.01); *B01L 2300/0819* (2013.01); *B01L 2300/0832* (2013.01); *B01L 2400/0487* (2013.01); *B01L 2400/0666* (2013.01); *B01L 2400/086* (2013.01)

(58) Field of Classification Search
None
See application file for complete search history.

(56) References Cited

U.S. PATENT DOCUMENTS

2004/0235153 A1* 11/2004 Takagi .................. C12M 35/04
435/293.2

* cited by examiner

*Primary Examiner* — Jyoti Nagpaul
(74) *Attorney, Agent, or Firm* — MUNCY, GEISSLER, OLDS & LOWE, P.C.

(57) ABSTRACT

A biomechanical testing system includes a reactor module, a storage unit and a pneumatic pressure source. The reactor module includes an upper board, a lower board, a positioning board disposed between and cooperating with the upper and lower boards to define an airtight space, a position-limiting member received in the airtight space, and at least one biological culture material positioned in the airtight space by the position-limiting member. The storage unit is adapted to supply a liquid to the airtight space. The pneumatic pressure source is controllable to supply gas to the storage unit so as to drive the liquid to flow from the storage unit into the airtight space and through the at least one biological culture material.

34 Claims, 22 Drawing Sheets

BIOMECHANICAL TESTING SYSTEM AND REACTOR MODULE THEREOF

FIELD

The disclosure relates to a biomechanical testing system, and more particularly to a biomechanical testing system that simulates a fluidic physiological environment (e.g., blood circulatory system, renal excretory system) for performing biomechanical tests.

BACKGROUND

A conventional method for analyzing vascular bifurcations (Sasaki et al., 2018, Neurosurgery, Volume 29, Issue 2) applies computational fluid dynamics (CFD) to simulate vascular bifurcation models and to analyze correlation between geometry of the bifurcations and formation of aneurysms. However, due to inherent intricacy of the vascular systems in the human or animal body (i.e., having varying diameters, bifurcation angles and branch patterns), such theoretical conventional method is insufficient in accuracy and inefficient in simulating different biological environments.

SUMMARY

Therefore, the object of the disclosure is to provide a biomechanical testing system and a reactor module thereof that can simulate fluidic physiological environments in physical forms.

According to an aspect of the disclosure, a biomechanical testing system includes a reactor module, a storage unit, and a pneumatic pressure source.

The reactor module includes an upper board, a lower board, a positioning board, a position-limiting member and at least one biological culture material. The lower board is disposed under the upper board. The positioning board is disposed between the upper board and the lower board, and defines and surrounds an upright through slot such that the positioning board cooperates with the upper board and the lower board to define an airtight space. The position-limiting member is received in the airtight space.

The at least one biological culture material is received in the airtight space and corresponds in position to the position-limiting member.

The storage unit is connected to the reactor module, and is adapted to hold a liquid and to supply the liquid to the airtight space. The pneumatic pressure source is connected to the storage unit, and is controllable to supply gas into the storage unit so as to drive the liquid to flow from the storage unit into the airtight space and through the at least one biological culture material.

According to another aspect of the disclosure, a reactor module includes an upper board, a lower board, a positioning board, a position-limiting member and at least one biological culture material.

The lower board is disposed under the upper board. The positioning board is disposed between the upper board and the lower board, and surrounds an upright through slot such that the positioning board cooperates with the upper board and the lower board to define an airtight space. The position-limiting member is received in the airtight space. The at least one biological culture material is received in the airtight space and corresponds in position to the position-limiting member.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
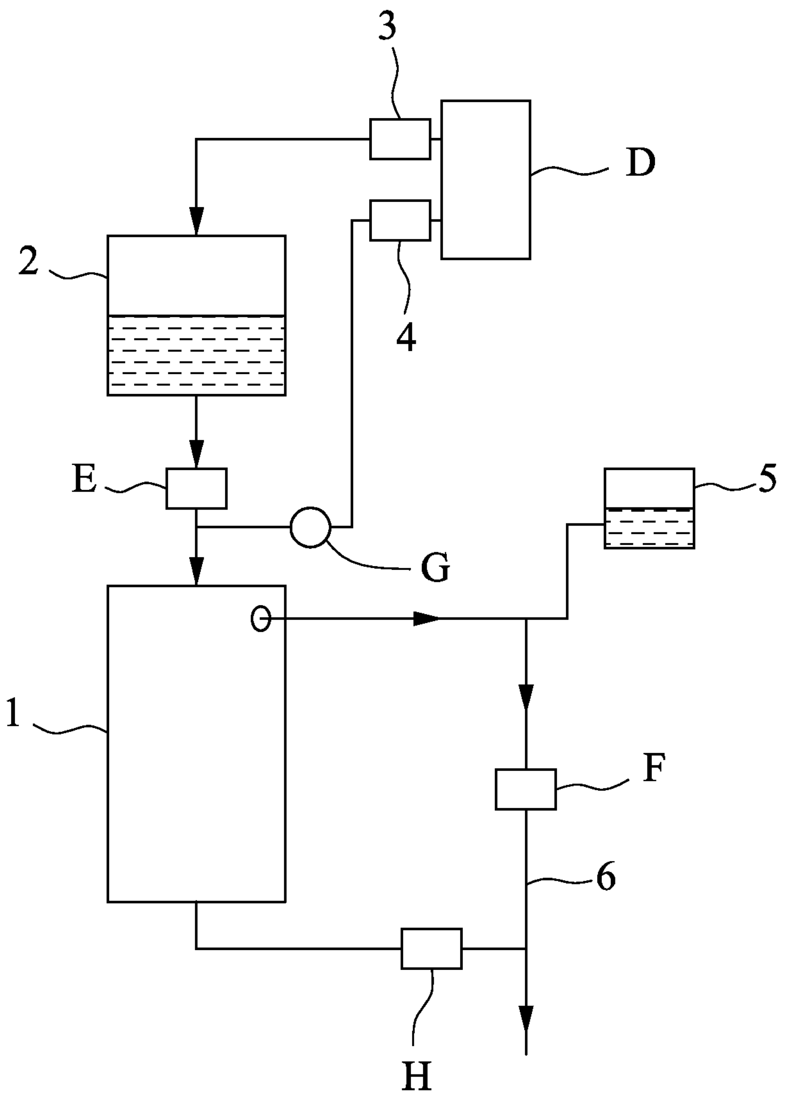
FIG. 1 is a schematic diagram, illustrating a first embodiment of a biomechanical testing system according to the disclosure.

Before the present disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of a biomechanical testing system according to the disclosure includes a reactor module 1, a storage unit 2, a pneumatic pressure source 3, a gas supply source 4, a buffer sink 5 and a drain pipeline 6.

Referring further to FIGS. 2 to 5, the reactor module 1 includes an upper board 11, a lower board 12, a positioning board 13, two gaskets 14, a position-limiting member 15 and a biological culture material 16. The upper board 11 is connected to the buffer sink 5 (see FIG. 1). The lower board 12 is disposed under the upper board 11, and is connected to the drain pipeline 6 (see FIG. 1). The positioning board 13 is disposed between the upper board 11 and the lower board 12, and defines and surrounds an upright through slot such that the positioning board 13 cooperates with the upper board 11 and the lower board 12 to define an airtight space 17. The positioning board 13 is adapted for a liquid held in the storage unit 2 to flow therethrough into the airtight space 17. The gaskets 14 are loop-shaped. One of the gaskets 14 is clamped between the upper board 11 and the positioning board 13, and the other one of the gaskets 14 is clamped between the positioning board 13 and the lower board 12. The position-limiting member 15 is received in the airtight space 17. The biological culture material 16 is received in the airtight space 17, and corresponds in position to and abuts against the position-limiting member 15.

Figure 5:
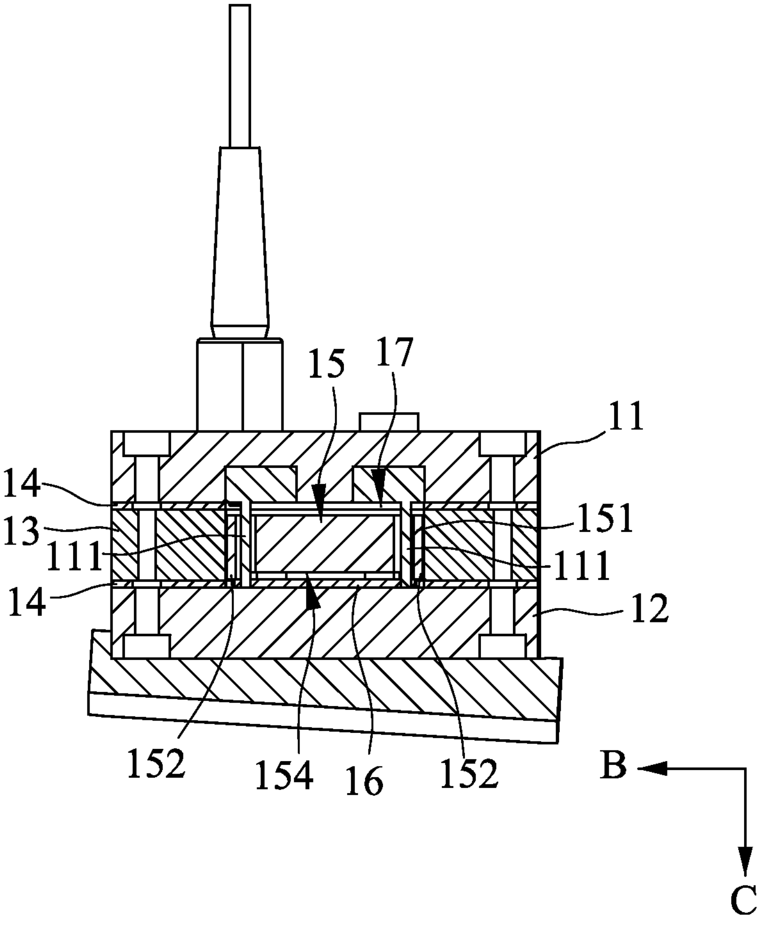
FIG. 5 is a front sectional view of the reactor module being assembled.

Specifically, the upper board 11 has two electrode groups 111 that extend downwardly into the airtight space 17 in a vertical direction (C), and that are connected to the biological culture material 16. In the present embodiment, each of the electrode groups 111 includes a row of pin-shaped electrodes (see FIG. 3) that are arranged in a first horizontal direction (A) perpendicular to the vertical direction (C), and the two electrode groups 111 are spaced apart from each other in a second horizontal direction (B) perpendicular to the first horizontal direction (A) and the vertical direction (C). The position-limiting member 15 is formed with a plurality of through slots (see FIG. 2) arranged in two rows and provided for the pin-shaped electrodes to extend respectively therethrough to be in contact with the biological culture material 16. It should be noted that the connection between the electrodes of the electrode groups 111 and the biological culture material 16, as shown in FIG. 5, may be one of press-contact and insertion. By virtue of such configuration, cells disposed on the biological culture material 16 can be electrically stimulated by an external power supply (not shown) so as to simulate reactions of the cells in a physiological environment (e.g., in a muscle, heart or nerve system), and by virtue of the electrode groups 111 being configured as pin-shaped electrodes, the electrical stimulation can be distributed faster and more evenly among the cells on the biological culture material 16. However, it should be noted that the electrode groups 111 are optional and not limited to the above-mentioned configuration. In variations of the present embodiment, other types of the electrodes may be included, or the electrodes may be omitted.

The lower board 12 is formed with a receiving slot 121 that extends therethrough in the vertical direction (C), that is in spatial communication with the airtight space 17, and that is configured to be communicated with the drain pipeline 6. In addition, the lower board 12 is operable to heat the airtight space 17, so that the airtight space 17 can be heated to a predetermined temperature to simulate the temperature inside a human body. The gaskets 14 are made of silicone and are used to facilitate the sealing of the airtight space 17. In the present embodiment, the upper board 11, the positioning board 13, the lower board 12, and the gasket 14 are stacked in the vertical direction (C) and are fixed together by strews.

Figure 2:
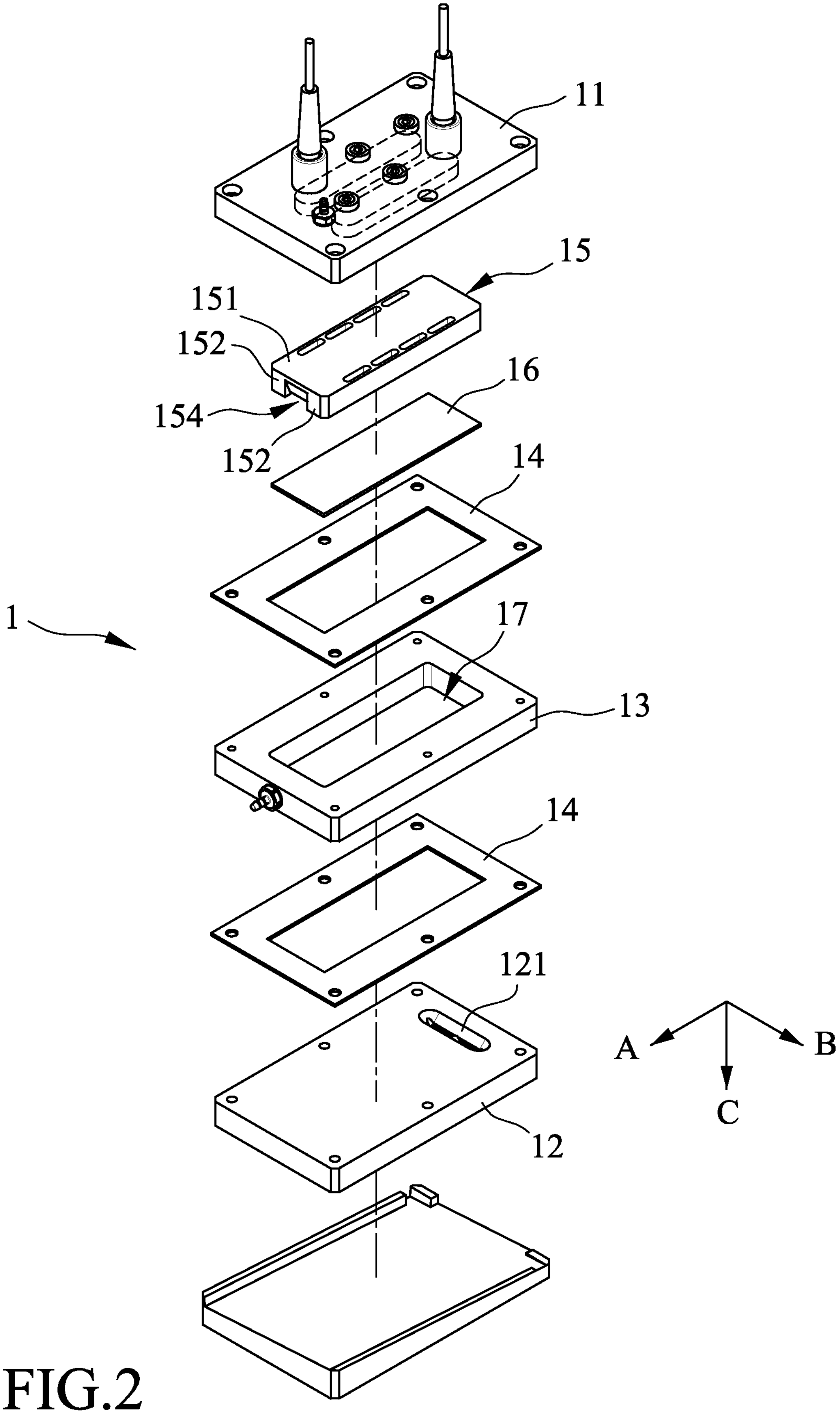
FIG. 2 is an exploded perspective view of a reactor module of the first embodiment.
Figure 3:
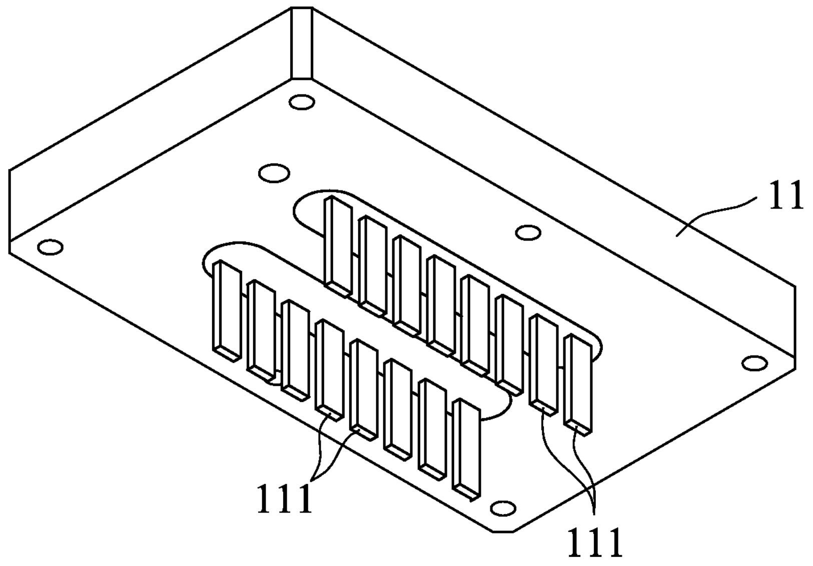
FIG. 3 is a perspective view, illustrating two electrode groups of the first embodiment.
Figure 6:
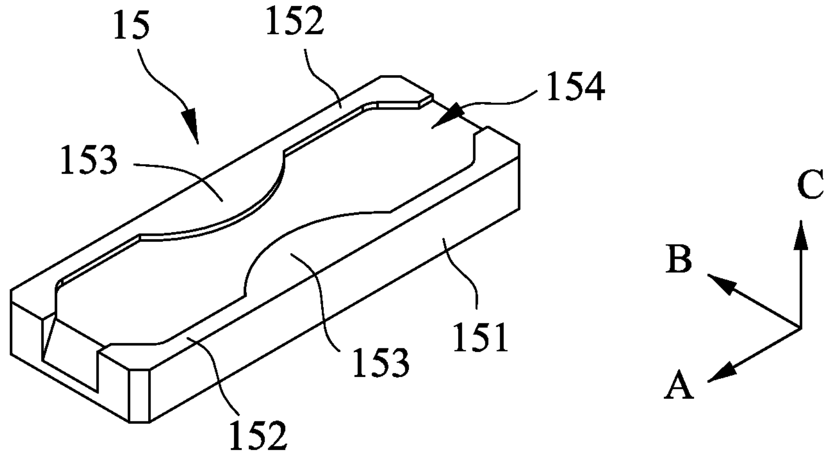
FIGS. 6 to 11 are perspective views, illustrating different configurations of a position-limiting member of the reactor module in variations of the first embodiment.

Referring to FIGS. 2, 5 and 6, the position-limiting member 15 defines a channel 154 that extends in the first horizontal direction (A), that has opposite ends in spatial communication with the airtight space 17, and that is adapted for the liquid supplied by the storage unit 2 to pass therethrough. Specifically, the position-limiting member 15 has a main body 151, two side wall portions 152 and two protruding portions 153. The main body 151 extends in the first horizontal direction (A). The side wall portions 152 protrude from the main body 151 in the vertical direction (C), extend parallelly in the first horizontal direction (A), are spaced apart from each other in the second horizontal direction (B), and are disposed respectively at opposite sides of the channel 154 along the second horizontal direction (B). The protruding portions 153 protrude respectively from the side wall portions 152 into the channel 154, and are opposite to each other in the second horizontal direction (B). It should be noted that, in the present embodiment, the position-limiting member 15 is disposed in the airtight space 17 in a manner that the side wall portions 152 protrude downwards as shown in FIG. 2 (i.e., the vertical direction (C) is a downward direction), and the side wall portions 152 are only shown as protruding upwards in FIG. 6 for the sake of illustration.

The biological culture material 16 abuts against the side wall portions 152 of the position-limiting member 15 along the vertical direction (C), and a side surface of the biological culture material 16 that is adapted for cell culture is exposed to the channel 154. In the present embodiment, the biological culture material 16 may be an adhesive silica film for culturing cells, a glass slide for culturing cells and extracellular matrices, or a biomedical material suitable for cells and soft materials, but not limited thereto.

Figure 7:
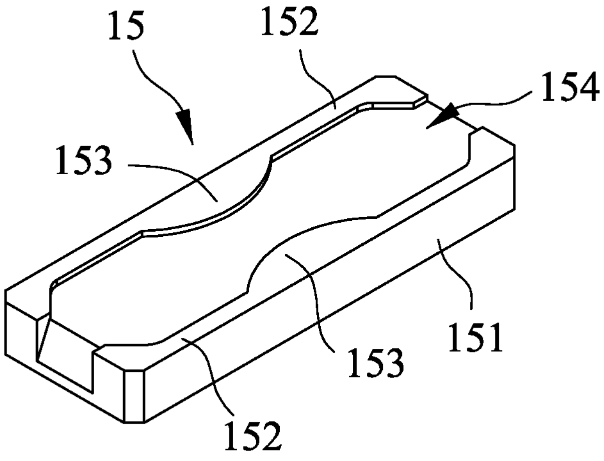
Figure 8:
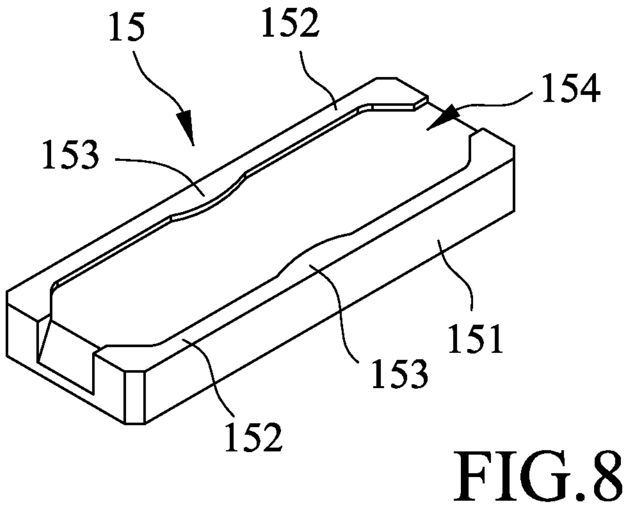

Referring to FIGS. 6, 7 and 8, in the present embodiment, each of the protruding portions 153 is arc-shaped, and protrudes toward the other one of the protruding portions 153 to form a narrow section of the channel 154, so as to simulate different degrees of blood vessel blockages for narrow passage environments in other organisms). The protruding portions 153 may be designed with different sizes as shown in FIGS. 6 to 8 depending on actual needs.

Figure 9:
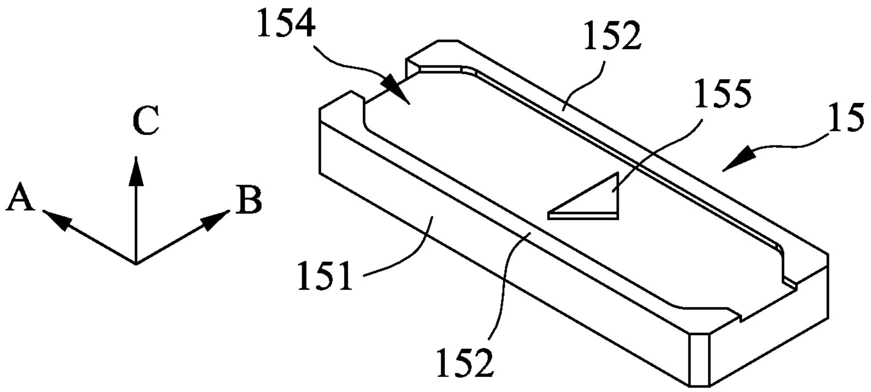
Figure 10:
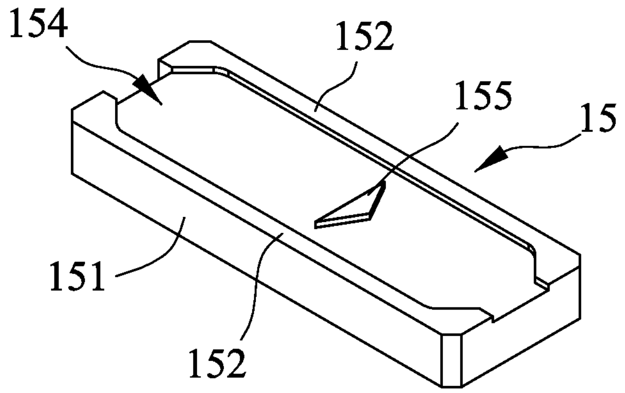
Figure 11:
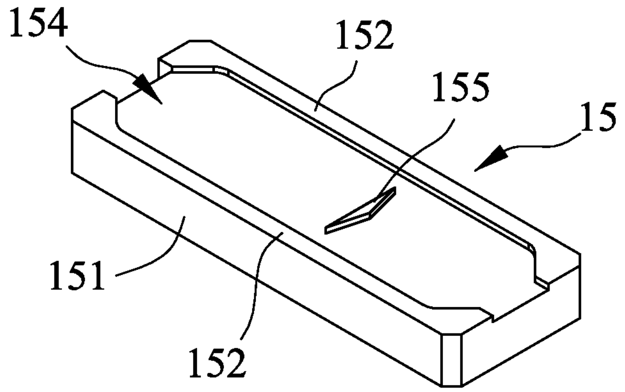

Referring to FIGS. 9, 10, and 11, the position-limiting member 15 may not be provided with the protruding portions 153, but instead has a block portion 155 that is disposed in the channel 154 and connected to the main body 151. As such, the block portion 155 causes the channel 154 to bifurcate, simulating a vascular bifurcation or other similar biological environment. The block portion 155 may be shaped as a triangular prism, a square prism or other polygonal prism, and a corner of the block portion 155 that causes the bifurcation of the channel 154 may be configured with different angles, as shown in FIGS. 9 to 11, to simulate different types of vascular bifurcation. Thereby, an operator may choose the position-limiting member 15 with a desired angle configuration to fit the simulation of a specific biological environment and set different boundary conditions for the channel 154 as required, which is versatile and suitable for modularization. In the present embodiment, the block portion 155 is made of acrylic.

Figure 12:
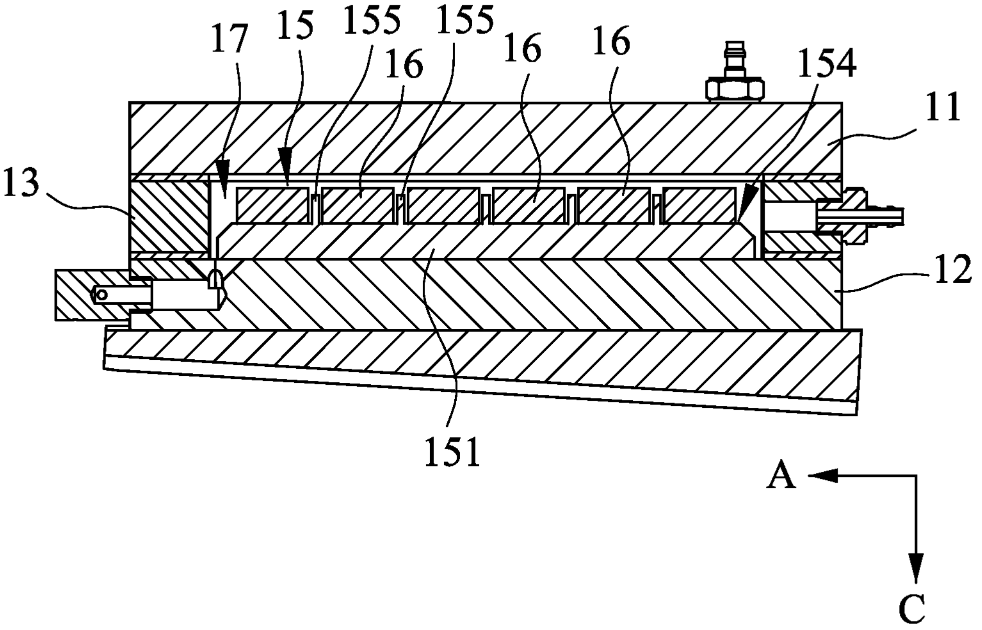
FIG. 12 is a side sectional view, illustrating the position-limiting member in yet another variation of the first embodiment.
Figure 13:
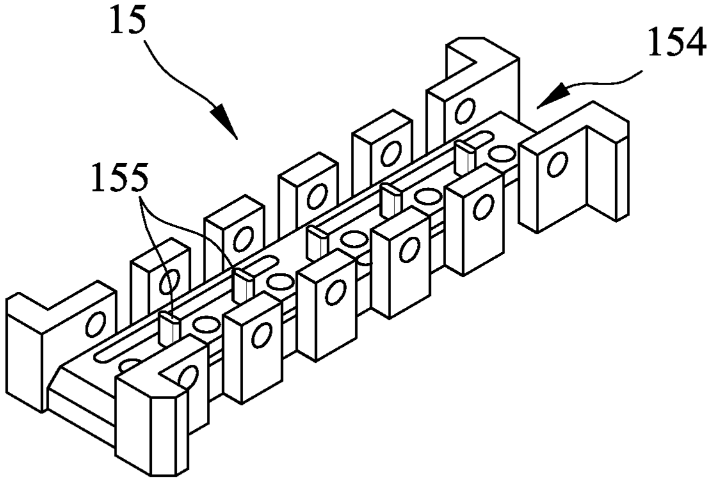
FIG. 13 is a perspective view of the position-limiting member of the same variation illustrated in FIG. 12.

Referring to FIGS. 12 and 13, in a variation of the first embodiment, the position-limiting member 15 is disposed upside down and the biological culture material 16 is disposed above the position-limiting member 15, such that the electrode groups 111 (see FIG. 3) do not need to extend through the position-limiting member 15 in order to contact the biological culture material 16. In this variation, if the biological culture material 16 is configured as a flat plate as shown in FIG. 2, the biological culture material 16 is disposed upside down. However, if the biological culture material 16 is configured as a plurality of blocks made of a biomedical material as shown in FIG. 12, the position-limiting member 15 may be provided with a plurality of block portions 155 that are arranged along the first horizontal direction (A), and each of the block portions 155 is configured as a column. In such a manner, the blocks of the biological culture material 16, as shown in FIG. 12, may be fixed on the position-limiting member 15 in a manner that the block portions 155 and the blocks of the biological culture material 16 are arranged alternately along the first horizontal direction (A), which expands the application of the biological culture material 16 and increases versatility of the simulation.

Figure 14:
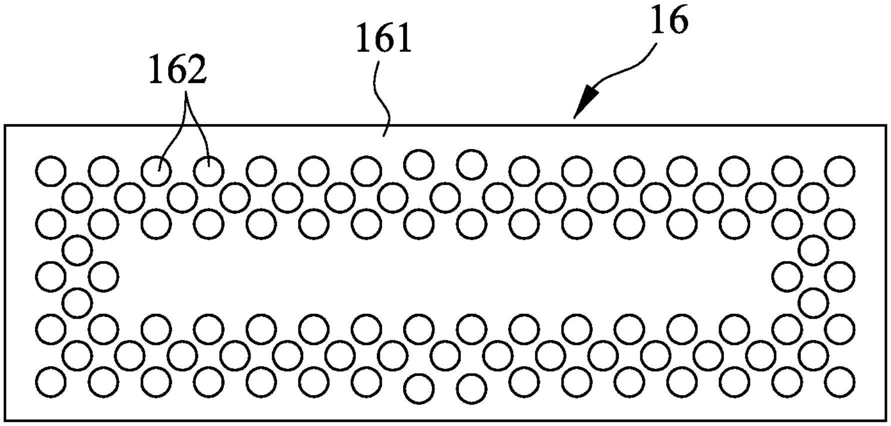
FIG. 14 is a schematic diagram, illustrating a biological culture material of a variation of the first embodiment.
Figure 15:
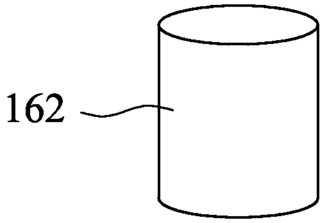
FIG. 15 is perspective view, illustrating a buffer protrusion of the biological culture material illustrated in FIG. 15.
Figure 16:
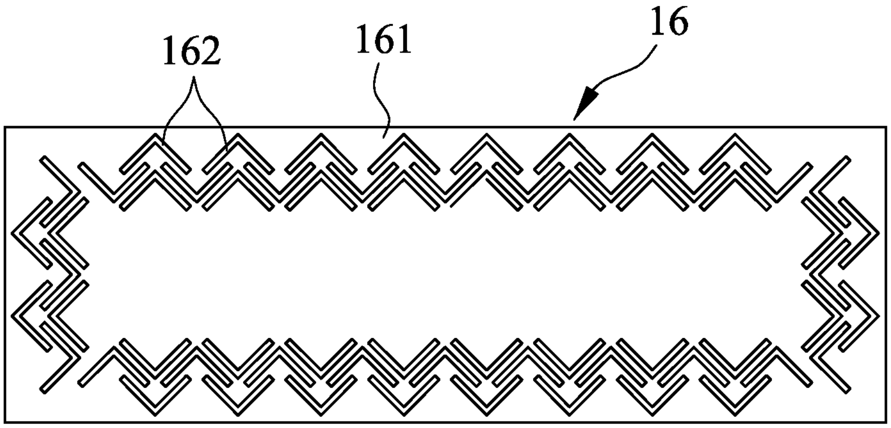
FIG. 16 is a schematic diagram, illustrating the biological culture material of another variation of the first embodiment.

Referring to FIGS. 14 to 16, in other variations of the previous embodiments, the biological culture material 16 is configured as a rectangular plate, and has a main portion 161 that is covered with a bio-based material, and a plurality of buffer protrusions 162 that protrude from a top end of the main portion 161. The buffer protrusions 162 may be configured as pillars, as shown in FIGS. 14 and 15, or as V-shaped waveforms, as shown in FIG. 16. It should be noted that, the buffer protrusions 162 are not limited to be arranged in manners as shown in FIGS. 14 and 16, and may be disposed proximal to any two opposite ends of the biological culture material 16. The buffer protrusions 162 are configured to abut against the position-limiting member 15 so as to prevent the position-limiting member 15 from pressing directly against and potentially damaging the bio-based material on the main portion 161. Referring again to FIGS. 1, 2 and 4, the storage unit 2 is connected to the reactor module 1, and is adapted to hold a liquid, such as a culture liquid, and to supply the liquid into the airtight space 17. The pneumatic pressure source 3 is connected to the storage unit 2, and is controllable to supply gas to the storage unit 2 so as to drive the liquid to flow from the storage unit 2 into the airtight space 17 and through the biological culture material 16. Specifically, the liquid is to be forced by gas input from the pneumatic pressure source 3 to pass through a silicone pipeline, through the positioning board 13, and into the airtight space 17 and the channel 154. The gas supply source 4 is connected to the storage unit 2 through the silicone pipeline, is in fluid communication with the airtight space 17, and is controllable to supply gas to the reactor module 1. The buffer sink 5 is connected to the upper board 11 of the reactor module 1 through the silicone pipeline, and is adapted to collect excess liquid overflowing from the channel 154. That is, the upper board 11 is adapted for the excess liquid in the channel 154 and the airtight space 17 to overflow therefrom into the buffer sink 5. The drain pipeline 6 is connected fluidly to the lower board 12 of the reactor module 1 and the buffer sink 5 to be in fluid communication with the receiving slot 121 and the upper board 11, and is adapted for discharging the liquid when in an open state (both of the receiving slot 121 and the upper board 11 are operable to be opened for discharging the liquid for recirculation, which will be further described hereinafter). It should be noted that although the storage unit 2, the gas supply source 4, the buffer sink 5, and the drain pipeline 6 are all connected to the airtight space 17, the sealing of airtight space 17 is ensured since each of the storage unit 2, the gas supply source 4, and the drain pipeline 6 is provided with a solenoid valve (E, F, H), and the buffer sink 5 is a closed environment.

Referring to FIGS. 1, 2, and 6, an operation of the first embodiment is described as follows.

When the channel 154 is to be filled with the culture liquid or when the culture liquid needs to be changed, the solenoid valve (F) is opened through a main controller (D) that controls a programmable gas pressure controller with analog signal, to thereby drive the pneumatic pressure source 3 to input gas into the storage unit 2, and the culture liquid in the storage unit 2 is thus forced into the airtight space 17 (the solenoid valve (E) on the pipeline of storage unit 2 is in the open state), and further into the channel 154 until the channel 154 is filled with the culture liquid. By virtue of the configurations of the protruding portion 153 or the block portion 155 (see FIG. 8), the channel 154 can simulate different physiological environments (e.g., vascular blockage or vascular bifurcation) for performing different simulations (e.g., simulations of cyclic fluid shear stress, stable fluid pressure, or uniform and rapid electrical stimulation). During the above-mentioned process for liquid filling or changing, the solenoid valve (F) that controls connection between the drain pipeline 6 and the buffer sink 5 may be switched to the open state, so that the culture liquid can be discharged through the drain pipeline 6.

Figure 17:
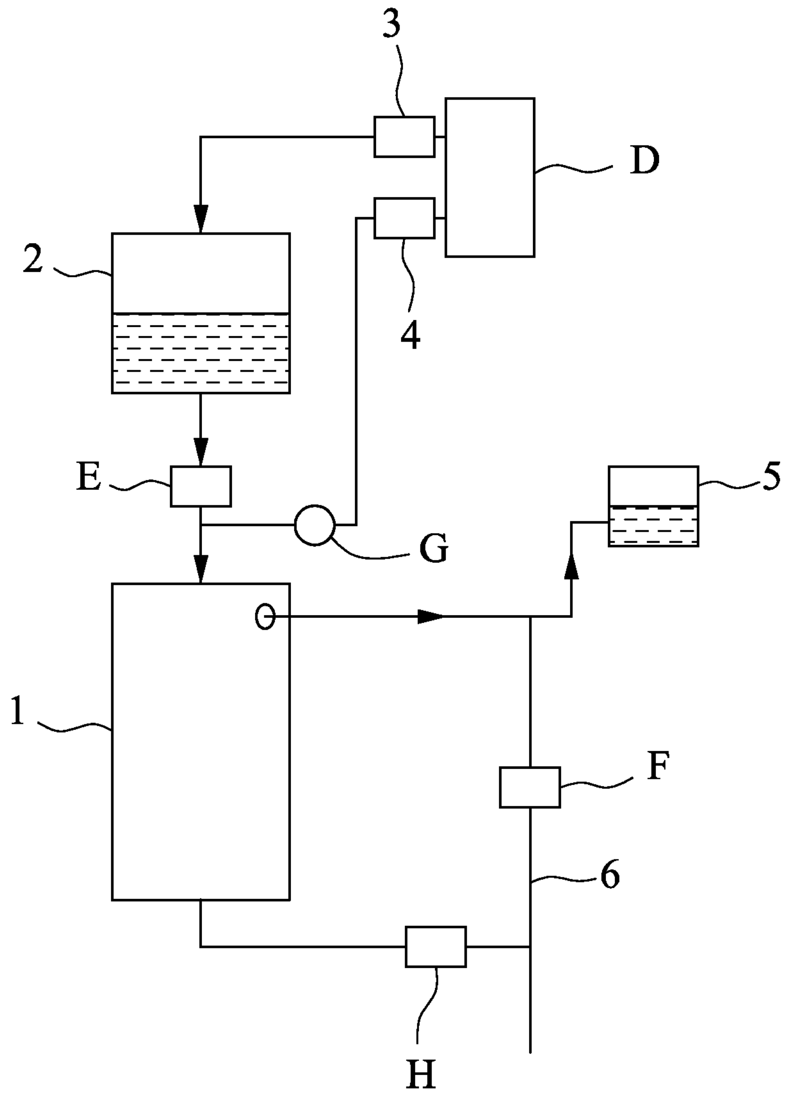
FIGS. 17 and 18 are schematic diagrams, illustrating different simulation actions of the first embodiment.

Referring to FIGS. 1, 5, and 17, the pneumatic pressure source 3 can also input the culture liquid in storage unit 2 into the channel 154 in the form of pulses, which can be monitored through an instrument such as a pressure gauge (G), so as to simulate fluid pulse stimulation. During the pulsed input, the culture liquid that temporarily overflows (due to the pulsing) will flow into the buffer sink 5 as temporal buffering. However, the buffer sink 5 may be omitted, and the fluid pressure is left to build up in the position-limiting member 15.

Figure 18:
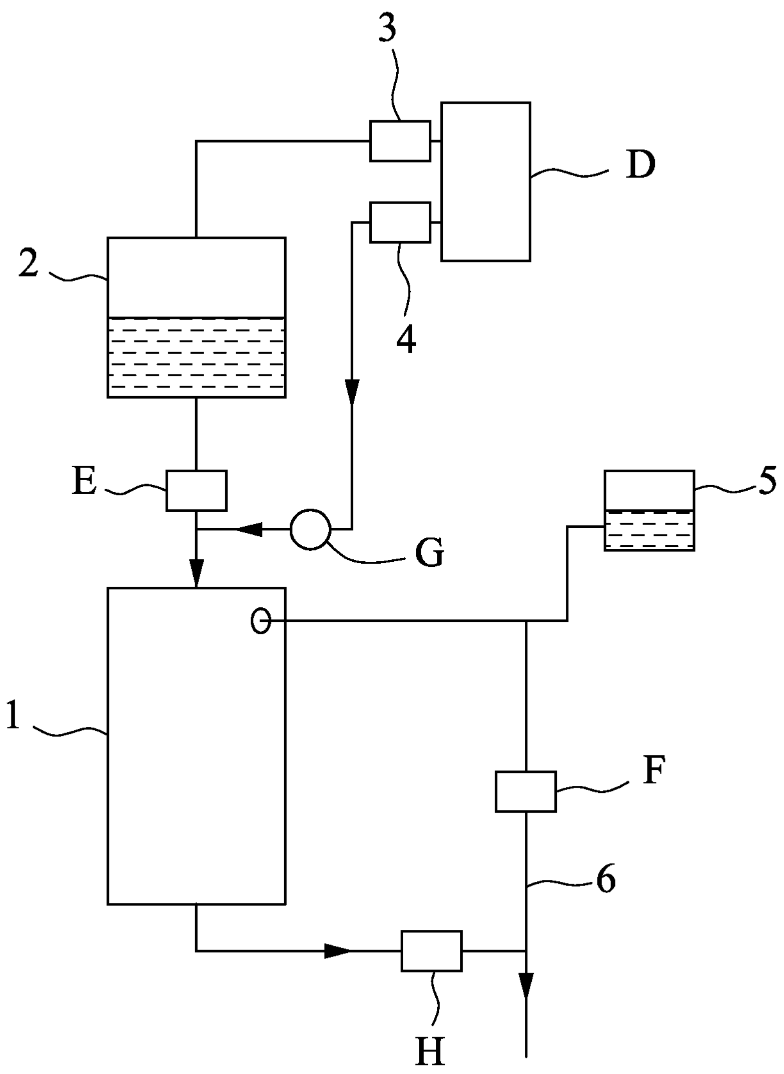

Referring to FIGS. 1, 5 and 18, when the liquid in the airtight space 17 and the channel 154 is to be emptied, the pneumatic pressure source 3 is deactivated and the gas supply source 4 is activated, so that the gas directly enters the airtight space 17, and the culture liquid is discharged from the drain pipeline 6 by gas pressure (at this time, the solenoid valve (H) of the drain pipeline 6 is in the open state).

Figure 19:
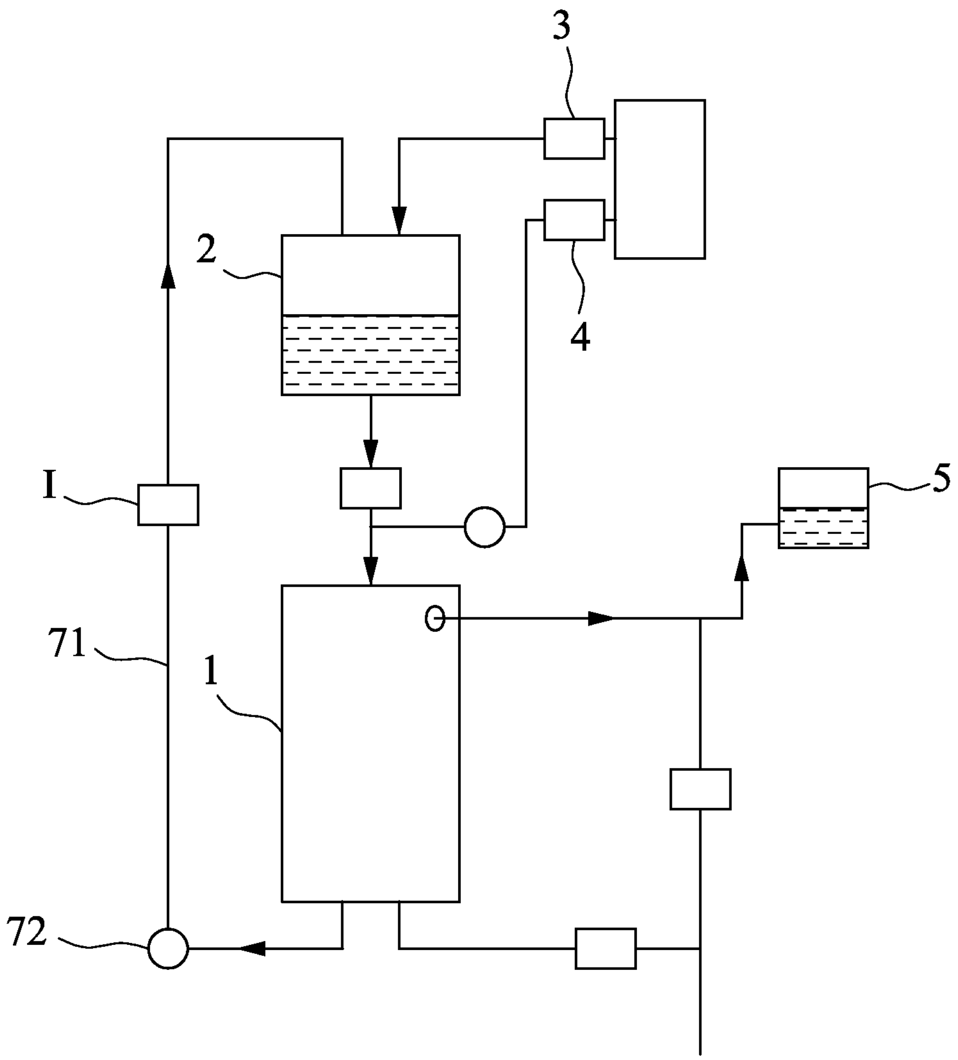
FIG. 19 is a schematic diagram, illustrating a variation of the first embodiment.

Referring to FIGS. 1, 5, and 19, the biomechanical testing system may further include a circulation pipeline 71 that is connected between the reactor module 1 and the storage unit 2, and that is provided with another solenoid valve (I), and a pump 72 that is mounted to the circulation pipeline 71, and that is controllable to force the liquid to flow from the reactor module 1 into the storage unit 2. As such, after the culture liquid fills the channel 154, it may be drawn out from the circulation pipeline 71 by the pump 72 (the solenoid valve (I) of the circulation pipeline 71 is in the open state), and be re-circulated to the storage unit 2 to create a fluid shear stress circulation, enabling simulations for different conditions and environments.

Figure 20:
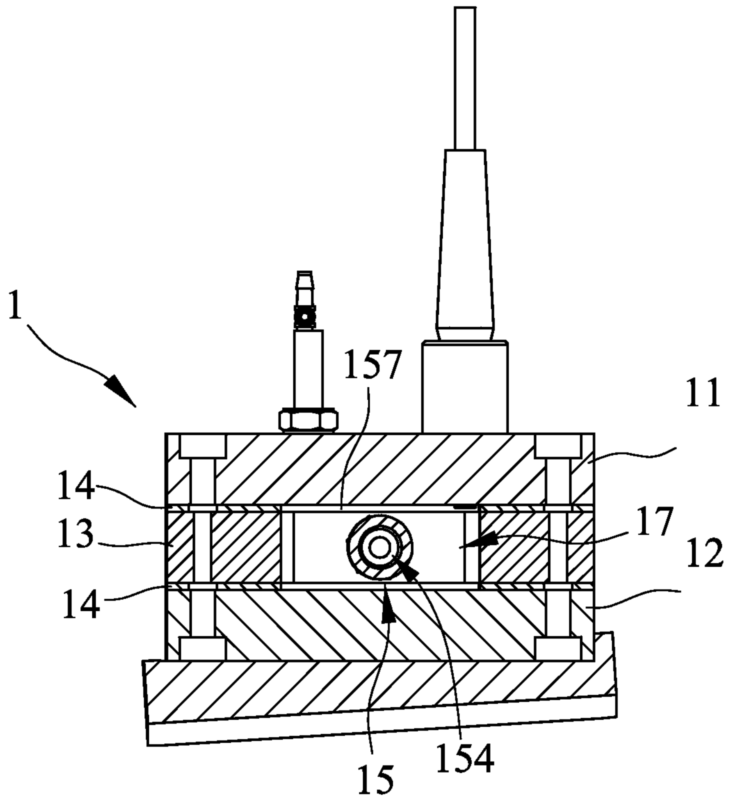
FIG. 20 is a front sectional view, illustrating the reactor module of a second embodiment of the biomechanical testing system according to the disclosure.
Figure 21:
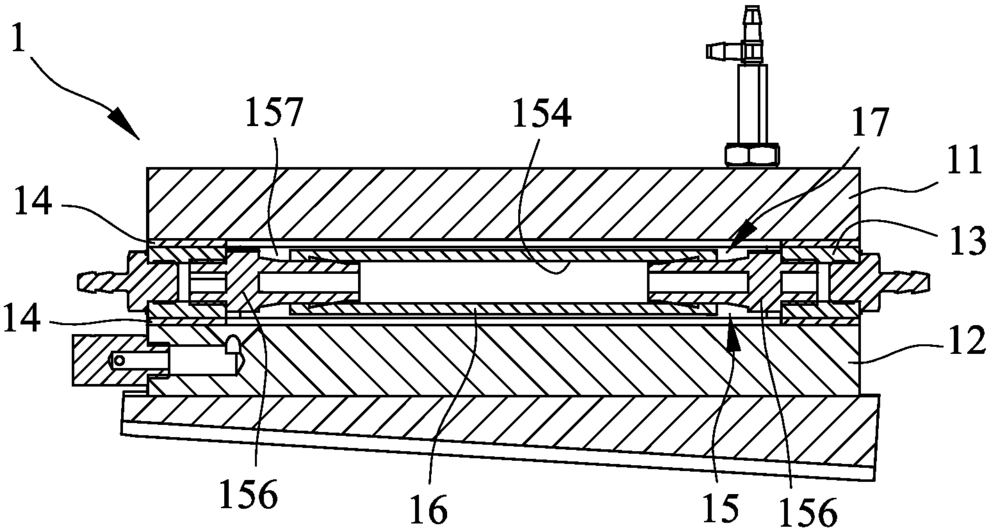
FIG. 21 is a side sectional view, illustrating the reactor module of the second embodiment.
Figure 22:
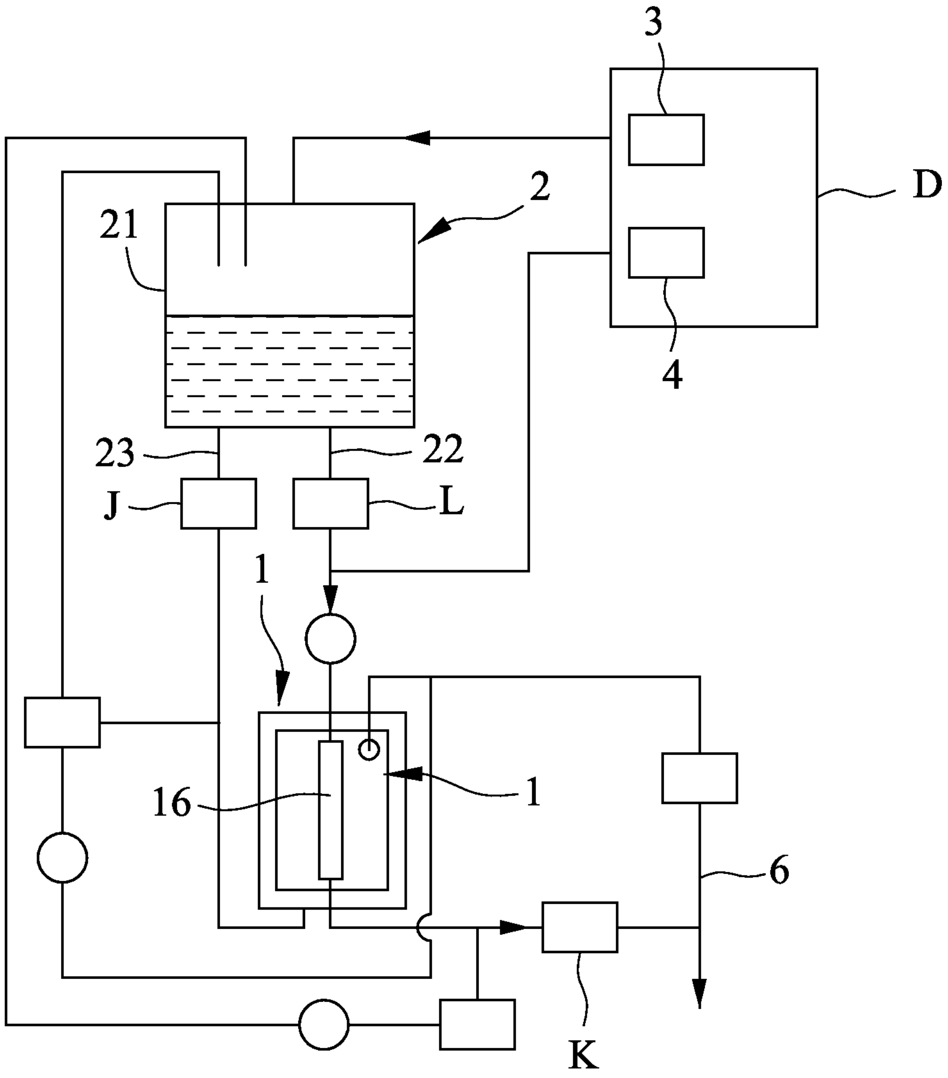
FIG. 22 is a schematic diagram, illustrating the second embodiment of the biomechanical testing system.

Referring to FIGS. 20, 21 and 22, a second embodiment of the biomechanical testing system of the disclosure is similar to the first embodiment, and the difference between the two lies in that, in the second embodiment, the position-limiting member 15 of the reactor module 1 has two connecting portions 156 that are inserted into the positioning board 13, and that are connected to the biological culture material 16 for positioning the biological culture material 16 in the airtight space 17.

In this embodiment, the biological culture material 16 is tubular, is positioned in the airtight space 17 by the position-limiting member 15, and cooperates with the position-limiting member 15 to divide the airtight space 17 into a channel 154 disposed within the position-limiting member 15, and an annular outer space 157 disposed outside the position-limiting member 15 and surrounding the channel 154. The biological culture material 16 has opposite ends that are disposed on the connecting portions 156, respectively. The storage unit 2 includes a container 21 that is adapted to hold the liquid and that is connected fluidly to the pneumatic pressure source 3, a first pipeline 22 that is connected fluidly to the container 21 and that is in spatial communication with the channel 154 through the upright through slot in the positioning board 13, and a second pipeline 23 that is connected fluidly to the container 21, and that is in spatial communication with the annular outer space 157. The first pipeline 22 is connected to one of the connecting portions 156 through the upright through slot in the positioning board 13, and the drain pipeline 6 is connected to the other one of the connecting portions 156 through the positioning board 13, and further connected to the annular outer space 157. The buffer sink 5 is omitted in this embodiment.

An operation of the second embodiment is described as follows. The pneumatic pressure source 3 inputs gas to the storage unit 2 to drive the culture liquid in the container 21 of the storage unit 2 (the solenoid valve (J) of the second pipeline 23 is in the closed state) to flow into the channel 154 through the first pipeline 22. The culture liquid may be discharged from the drain pipeline 6 by switching the solenoid valve (K) to the open state. When a pulse response is to be performed, only the solenoid valve (L) of the first pipeline 22 should be switched to open, and a main controller (D) is operated to control the programmable gas pressure controller via analog signals, such that the pneumatic pressure source 3 intermittently inputs gas to generate a pulse response in the channel 154.

Figure 23:
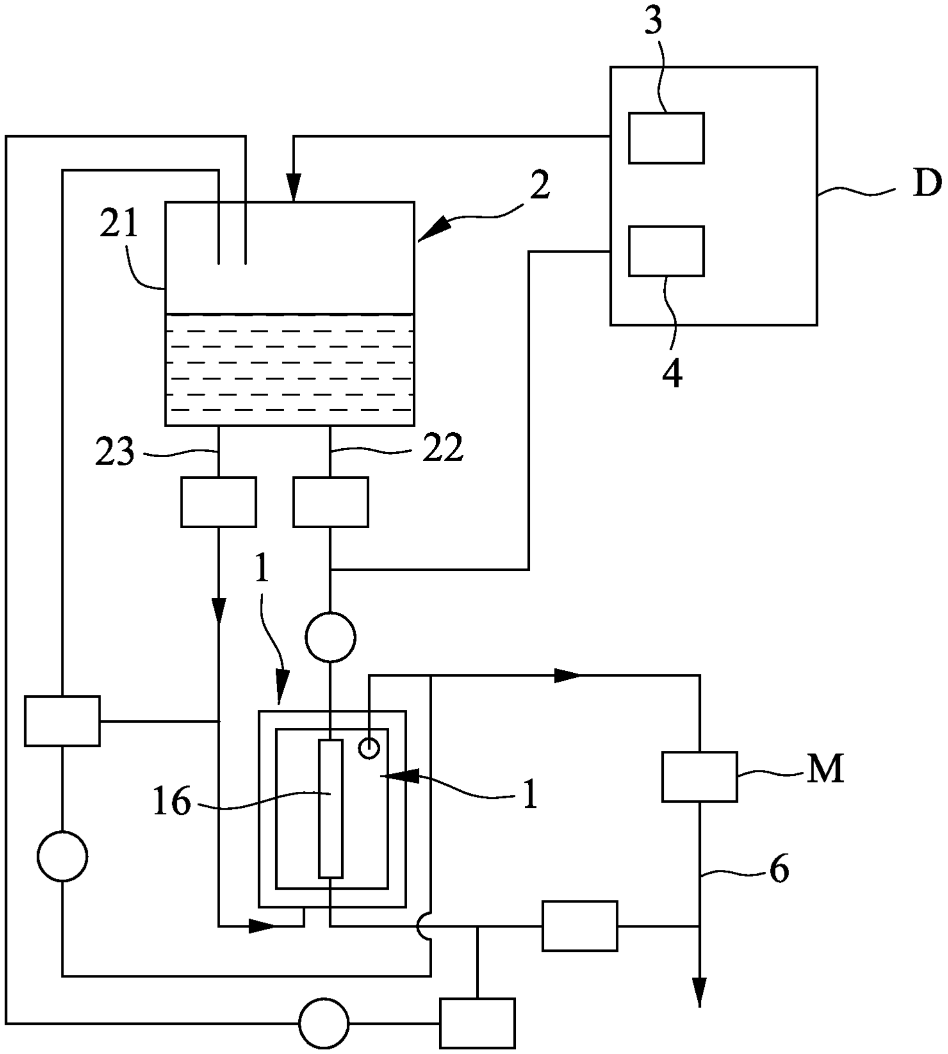
FIGS. 23 to 26 are schematic diagrams, illustrating different simulation actions of the second embodiment.

Referring to FIGS. 21 and 23, an operator may close the first pipeline 22 and open the second pipeline 23, such that the culture liquid enters the annular outer space 157 from the second pipeline 23, and be discharged by switching another solenoid valve (M) of the drain pipeline 6 to open, providing simulation of another environment.

Figure 24:
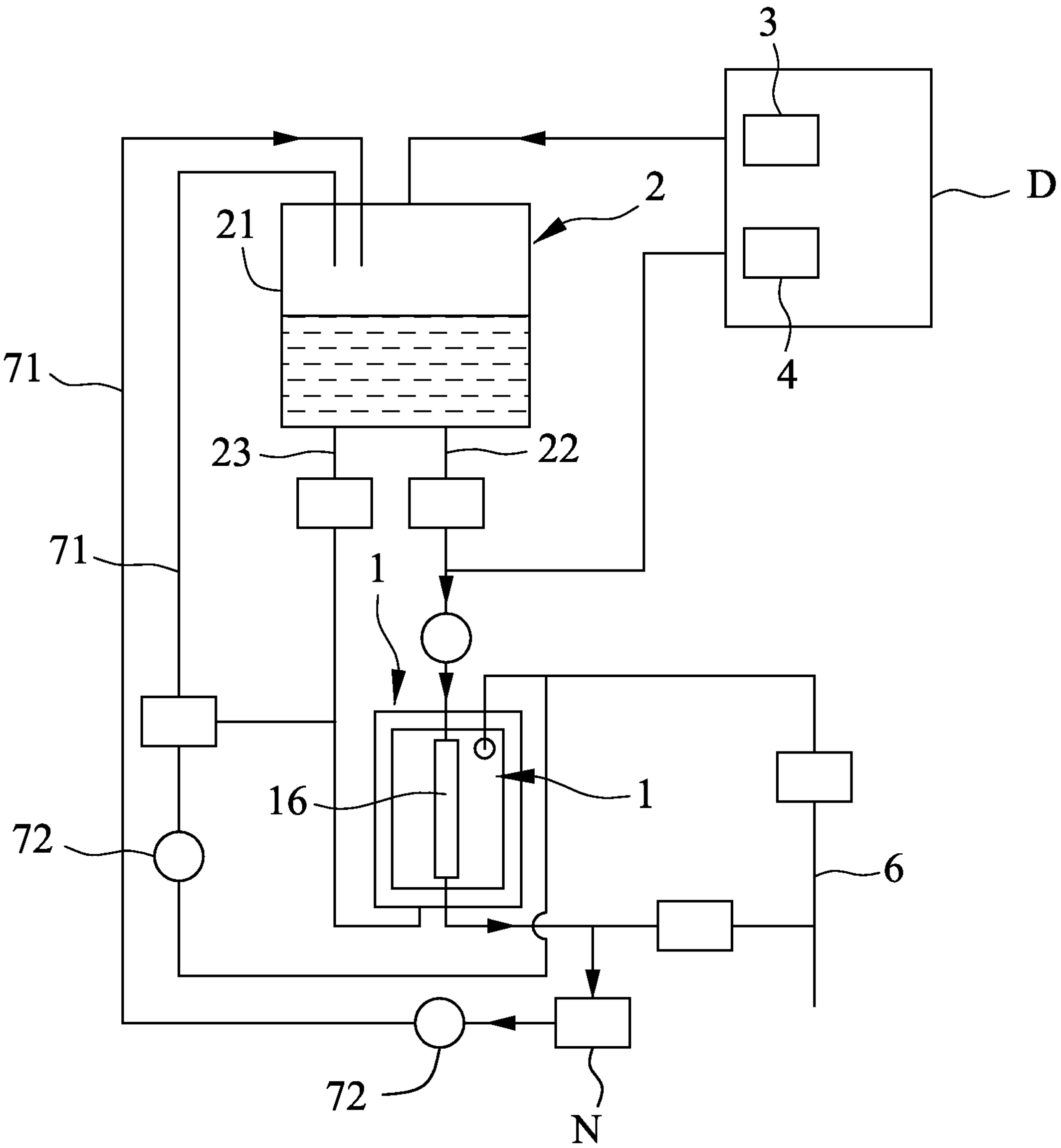

Referring to FIGS. 21 and 24, the second embodiment further includes two circulation pipelines 71 that are connected between the storage unit 2 and the drain pipeline 6, and that are each controllable to switch between an open state and a closed state, and two pumps 72 that are mounted respectively to the circulation pipelines 71 and that are controllable to force the liquid to flow from the drain pipeline 6 into the storage unit 2. One of the circulation pipelines 71 is connected fluidly to the channel 154, and the other one is connected fluidly to the annular outer space 157 and the second pipeline 23.

When the one of the circulation pipelines 71 connected to the channel 154 is in the open state, the culture liquid may be drawn by the pump 72 of the circulation pipeline 71 after entering the channel 154 (a corresponding solenoid valve (N) is open) to flow back to the container 21, performing simulation of circulation within the pipelines.

Figure 25:
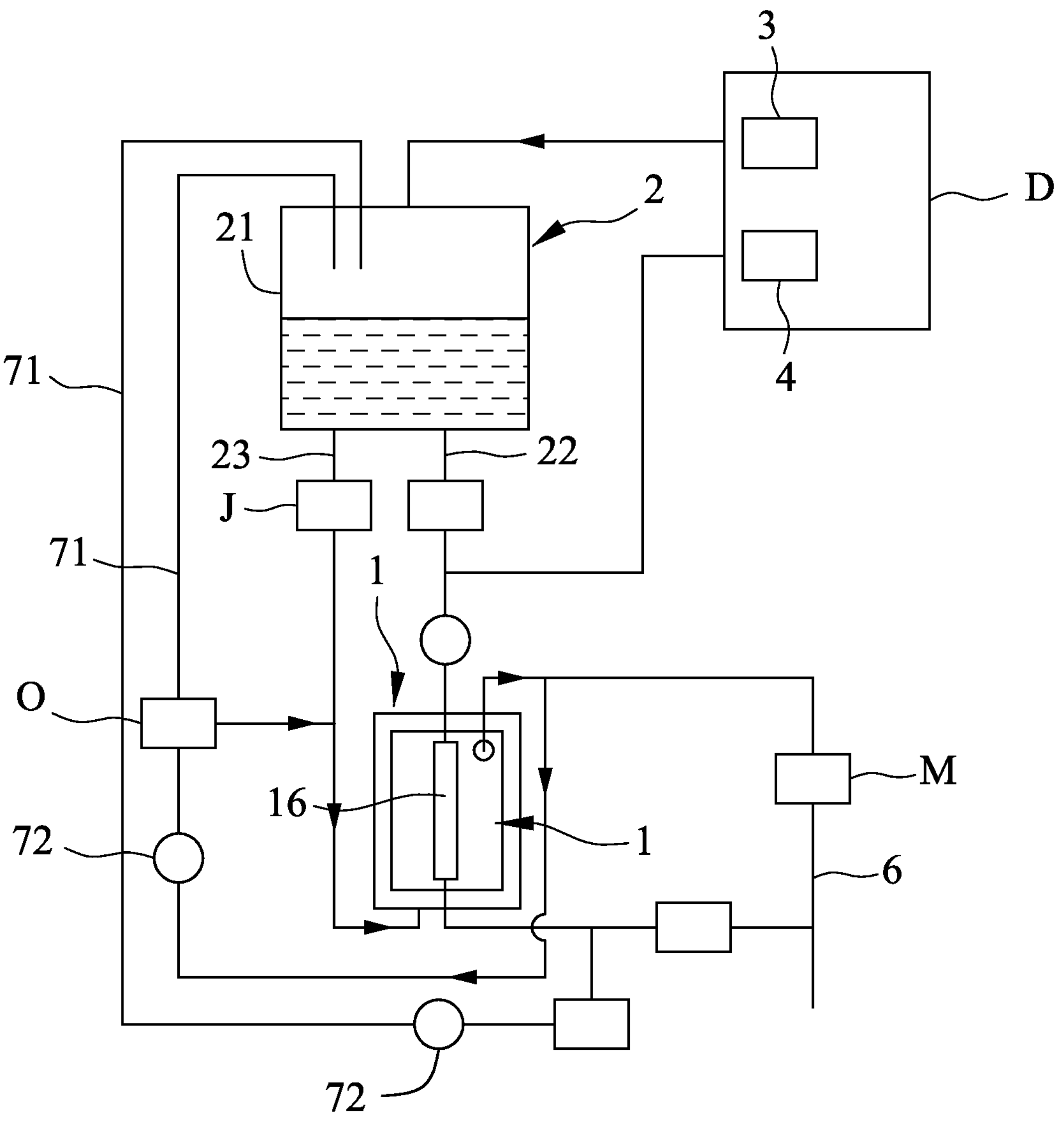

Referring to FIGS. 21 and 25, when the annular outer space 157 is filled with the culture liquid, most of the solenoid valves is closed, and only the solenoid valve (J) of the second pipeline 23 and the solenoid valve (O) of the circulation pipeline 71 which is connected to the annular outer space 157 are opened. As such, the culture liquid may circulate among the second pipeline 23, the annular outer space 157, the drain pipeline 6 (the solenoid valve (M) is closed so that the culture liquid will not be discharged therefrom) and the circulation pipeline 71 through the pump 72, thereby performing simulation of circulation outside the pipelines.

Figure 26:
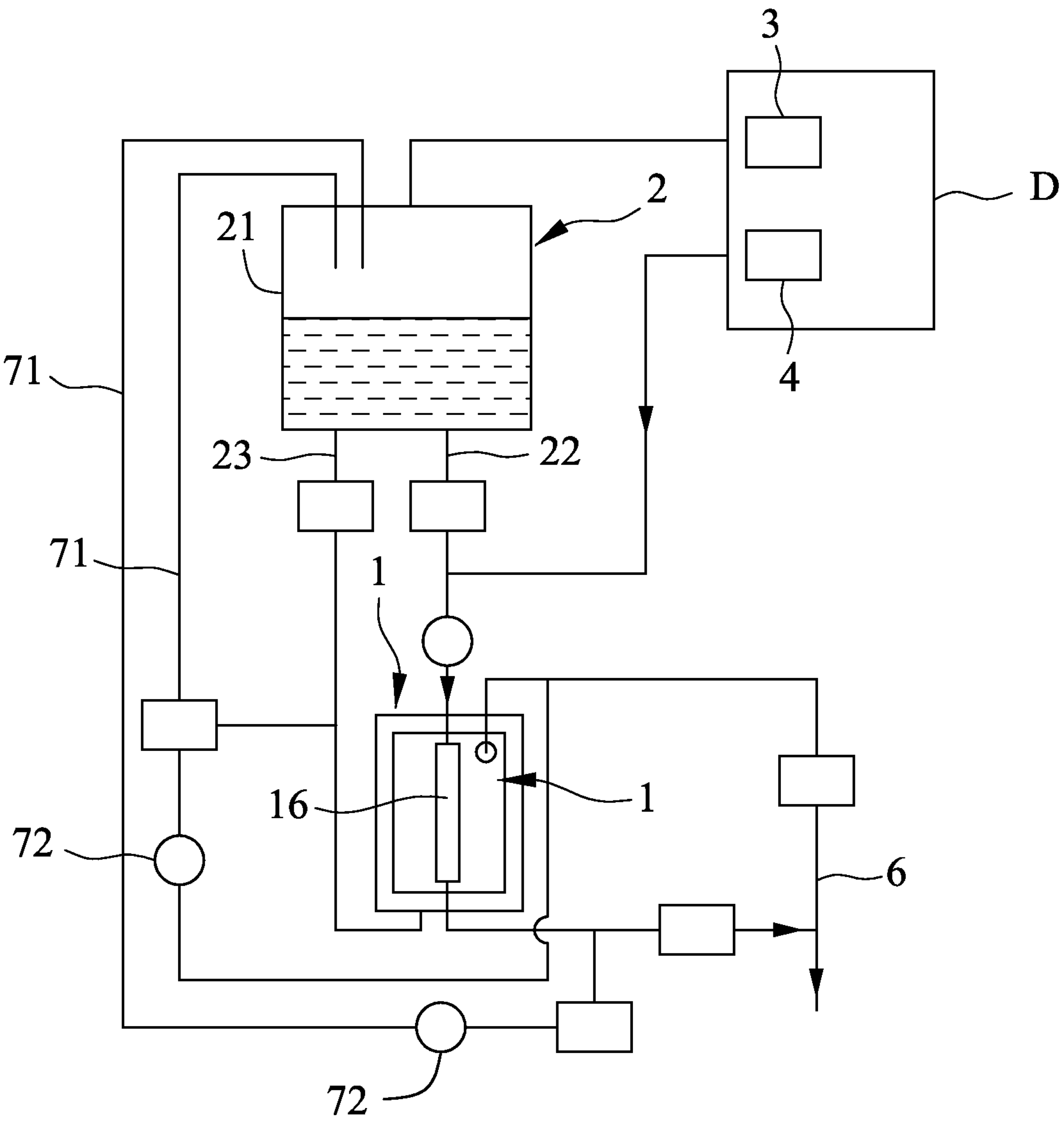

Referring to FIGS. 21 and 26, when the culture liquid in channel 154 is to be fully discharged, the pneumatic pressure source 3 is deactivated and the gas supply source 4 is activated, so that the gas in the gas supply source 4 is directly sent to the channel 154 via the first pipeline 22, and then be discharged from the drain pipeline 6 to empty the pipelines. If the culture liquid in the annular outer space 157 is to be fully discharged, another gas supply (not shown) may be connected to the second pipeline 23. In addition, in the second embodiment, the biological culture material 16 may be configured as a tube made of biomedical materials, providing more flexibility to the simulation of physiological environments.

Figure 27:
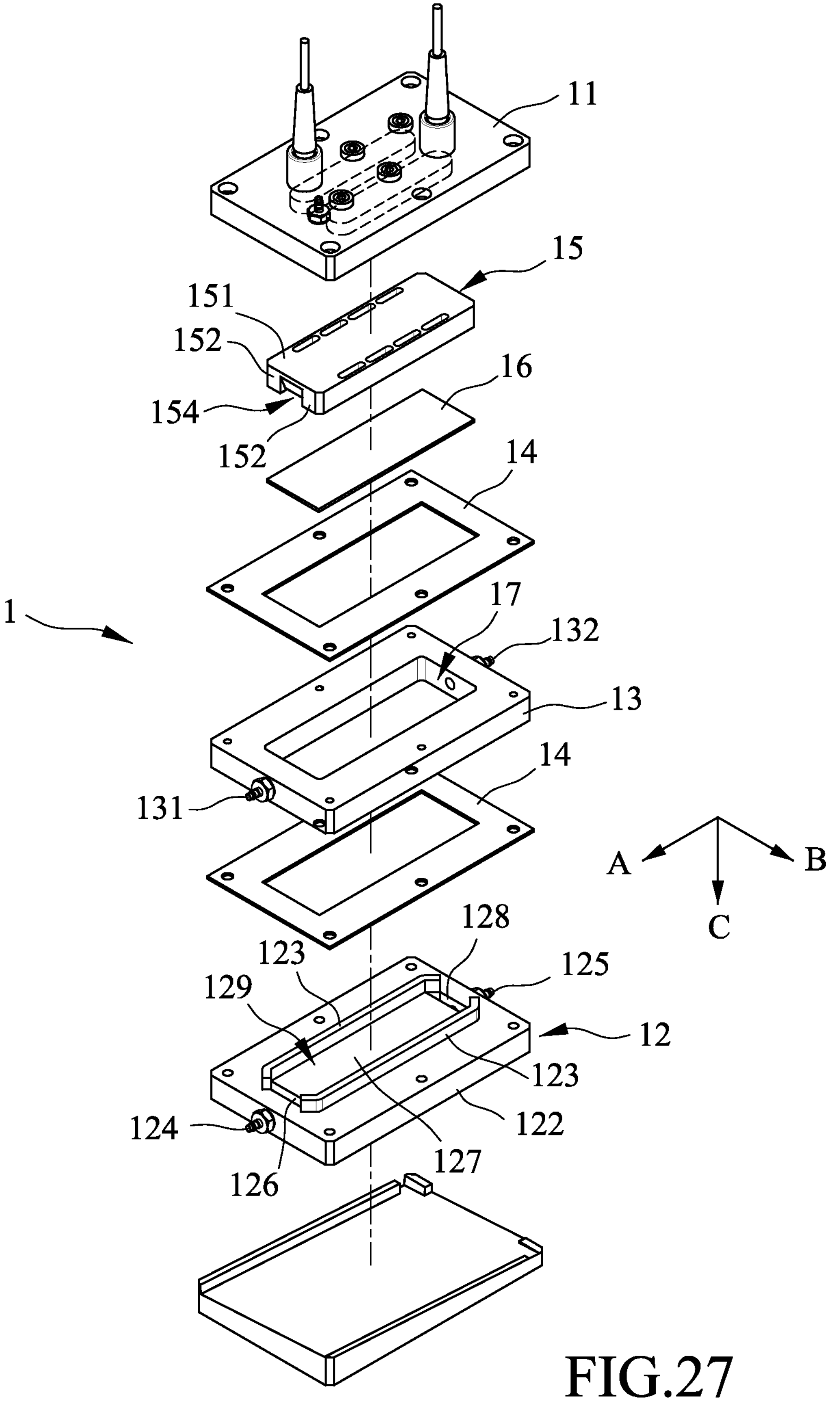
FIG. 27 is an exploded perspective view, illustrating the reactor module of a third embodiment of the biomechanical testing system according to the disclosure.
Figure 28:
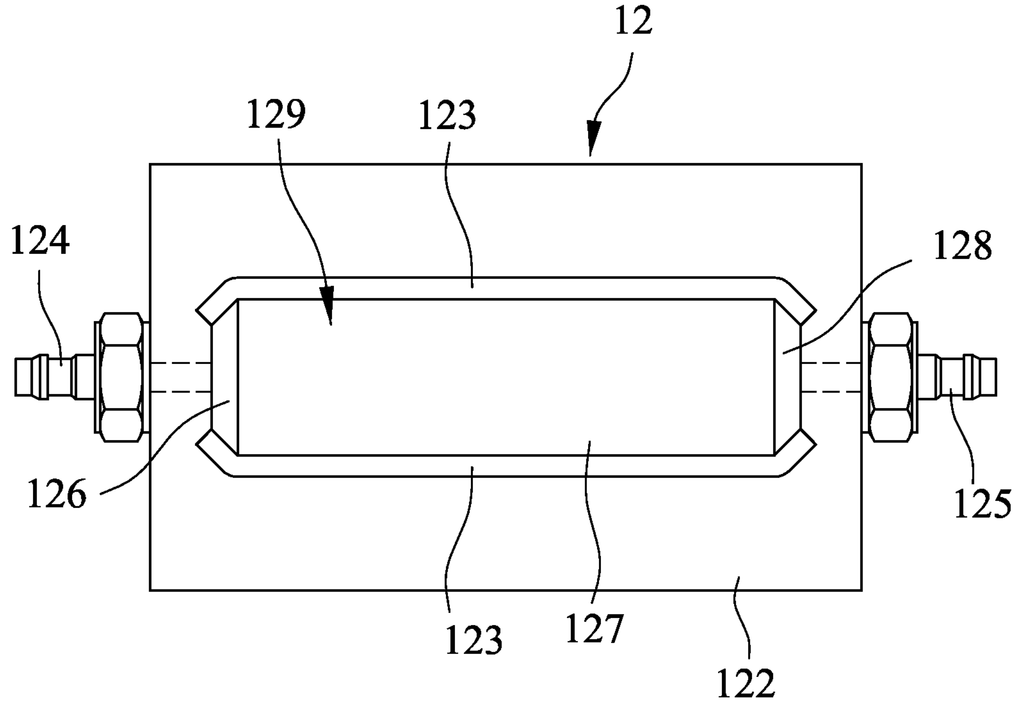
FIG. 28 is a top view of a lower board of the reactor module of the third embodiment.

Referring to FIGS. 27 and 28, a third embodiment of the biomechanical testing system according to the present disclosure is similar to the first embodiment, and the differences between the two are described as follows.

In the third embodiment, the positioning board 13 has an input opening 131 and an output opening 132 that are formed respectively at opposite ends of the positioning board 13, that are opposite to each other along the first horizontal direction (A), and that are in fluid communication with the airtight space 17. The lower board 12 has a bottom portion 122 and two rib portions 123.

The bottom portion 122 of the lower board 12 extends in the first horizontal direction (A), and has an inlet hole 124, an outlet hole 125, a connecting surface 127, a first inclined surface 126 and a second inclined surface 128. The inlet hole 124 and outlet hole 125 are formed respectively at opposite ends of the bottom portion 122, and are opposite to each other along the first horizontal direction (A). The connecting surface 127 extends in the first horizontal direction (A). The first and second inclined surfaces 126, 128 are opposite to each other in the first horizontal direction (A), are connected respectively to opposite ends of the connecting surface 127, are inclined upwardly toward the connecting surface 127, and are proximal to the inlet and outlet holes 124, 125, respectively. The rib portions 123 of the lower board 12 protrude from the bottom portion 122, are spaced apart from each other in the second horizontal direction (B), and are configured to abut against the biological culture material 16 for support. The bottom portion 122 and the rib portions 123 cooperatively define an added passage 129 that has opposite ends being in fluid communication with the inlet and outlet holes 124, 125, respectively, and being opposite to each other along the first horizontal direction (A). A distance between middle segments of the rib portions 123 along the second horizontal direction (B) is greater than a distance between opposite end segments of the rib portions 123 along the second horizontal direction (B), such that the added passage 129 becomes narrower near its opposite ends along the first horizontal direction (A). The connecting surface 127 and the first and second inclined surfaces 126, 127 are disposed between the rib portions 123 and are exposed to the added passage 129.

By virtue of the above-mentioned configurations of the present embodiment, a fluid may flow through two paths that are disposed respectively on upper and lower sides of the biological culture material 16. Specifically, the fluid may flow through the airtight space 17 via the input and output openings 131, 132 of the positioning board 13, or through the added passage 129 (along the first inclined surface 126, the connecting surface 127 and the second inclined surface 128) via the inlet and outlet holes 124, 125 of the lower board 12. As such, different fluid simulations (e.g., simulations of two different fluids or the same fluid with two different flow rates) can be performed on the upper and lower sides of the biological culture material 16, allowing for greater flexibility in simulations.

Figure 4:
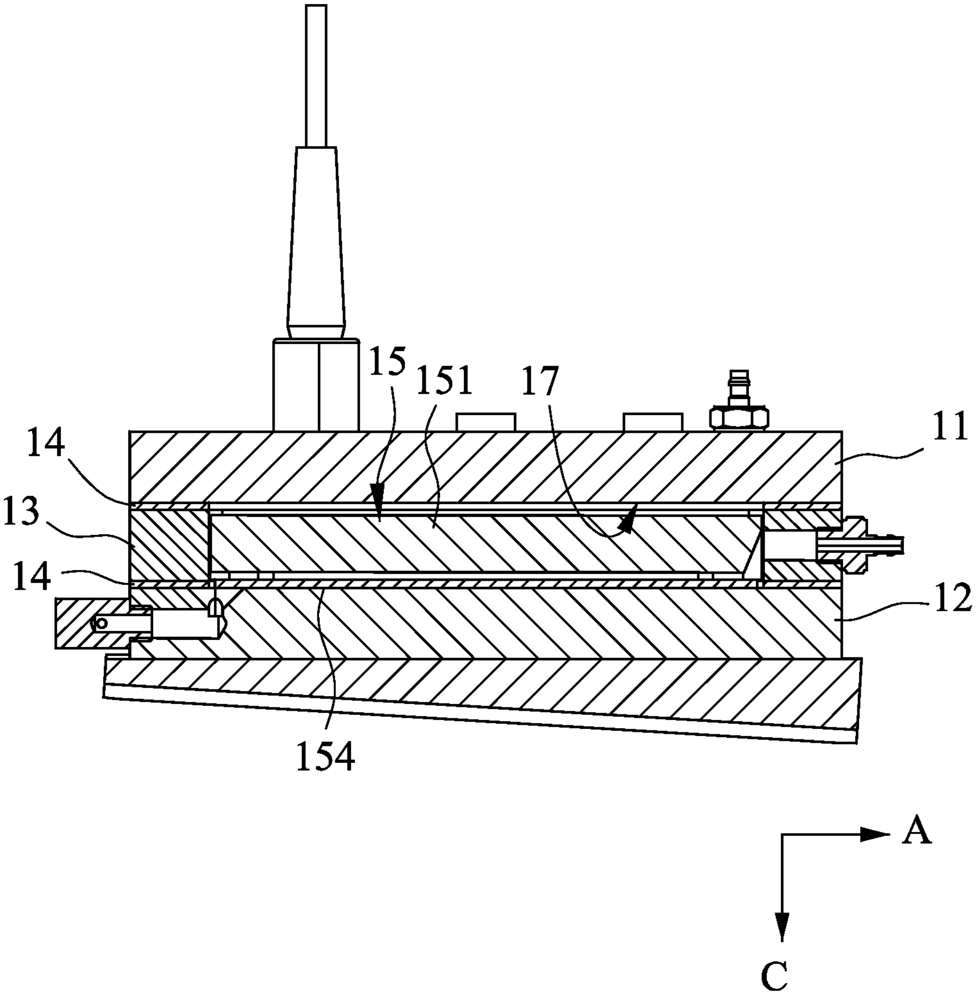
FIG. 4 is a side sectional view of the reactor module being assembled.

It should be noted that, the inlet and outlet holes 124, 125 may be configured in the fashion as shown in FIG. 4, where a height of the inlet hole 124 in reference to a bottom end of the reactor module 1 along the vertical direction (C) is different from a height of the outlet hole 125 in reference to the bottom end of the reactor module 1 along the vertical direction (C) such that the fluid can fill the added passage 129 in a more sufficient manner.

Figure 29:
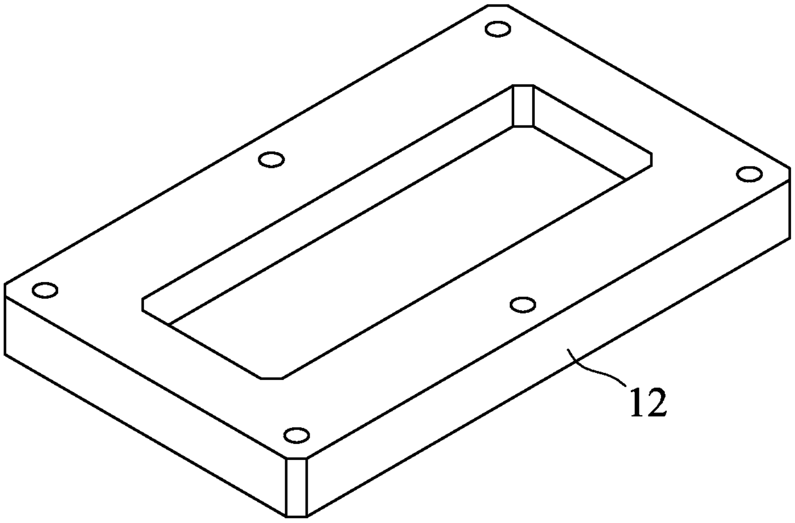
FIG. 29 is a perspective view, illustrating a variation of the lower board of the reactor module.
Figure 30:
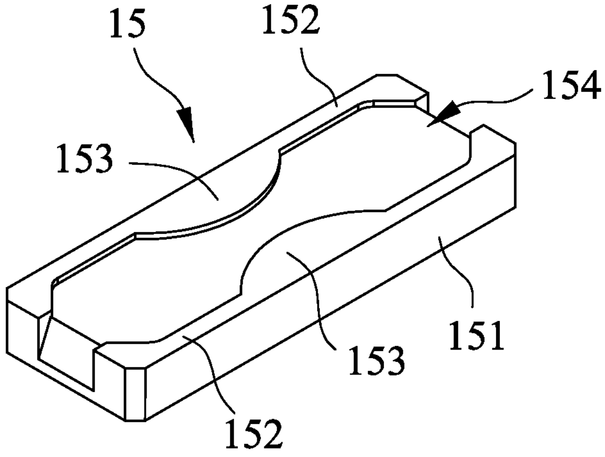
FIG. 30 is a perspective view, illustrating yet another configuration of the position-limiting member of the reactor module.

Referring to FIGS. 29 and 30, in a variation of the embodiment, the lower board 12 has a receiving recess that is recessed from a top surface of the lower board 12, and that is provided for receiving the position-limiting member 15, such that the added passage 129 is cooperatively defined by the receiving recess of the lower board 12 and the position-limiting member 15. In such a manner, dimensions of the added passage 129 are adaptable by changing configuration of the position-limiting member 15, providing a modularized option for simulation. In addition, the position-limiting member 15 may be configured as shown in FIG. 30, where the position-limiting member 15 has opposite end surfaces that are opposite to each other in the first horizontal direction (A), and that are inclined relative to a bottom end of the position-limiting member 15 (only one of the inclined end surfaces is visible in FIG. 30). Such configuration may also be adopted for any of the position-limiting members 15 shown in FIGS. 6 to 11.

In sum, by virtue of the configurations of the biological culture material 16 and the channel 154 of the position-limiting member 15 of the aforementioned embodiments, the biomechanical testing system of the present disclosure is able to perform simulations of various physiological environments, such as simulations of cyclic fluid shear stress, stable fluid pressure, fluid pulse stimulation and electrical stimulation, providing high versatility for the simulation and testing.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A biomechanical testing system comprising:

a reactor module that includes
- an upper board,
- a lower board disposed under said upper board,
- a positioning board disposed between said upper board and said lower board, and defining and surrounding an upright through slot such that said positioning board cooperates with said upper board and said lower board to define an airtight space,
- a position-limiting member received in said airtight space, and
- at least one biological culture material received in said airtight space and corresponding in position to said position-limiting member;

a storage unit that is connected to said reactor module, and that is adapted to hold a liquid and to supply the liquid into said airtight space; and a pneumatic pressure source that is connected to said storage unit, and that is controllable to supply gas to said storage unit so as to drive the liquid to flow from said storage unit into said airtight space and through said at least one biological culture material;

wherein said position-limiting member defines a channel that is in spatial communication with said airtight space, and that is adapted for the liquid supplied by said storage unit to pass therethrough, said at least one biological culture material being exposed to said channel;

wherein said biomechanical testing system further comprises a buffer sink that is connected to said reactor module, and that is adapted to collect excess liquid overflowing from said channel;

wherein said position-limiting member has a main body that extends in a first horizontal direction, and two side wall portions that protrude from said main body in a vertical direction transverse to the first horizontal direction, that extend in parallel in the first horizontal direction, and that are spaced apart from each other in a second horizontal direction transverse to the first horizontal direction and the vertical direction, said side wall portions being disposed respectively at opposite sides of said channel; and wherein said position-limiting member further has at least one block portion that is disposed in said channel and connected to said main body, and that has a polygonal prism shape.

2. The biomechanical testing system as claimed in claim 1, wherein said at least one biological culture material of said reactor module has a main portion and a plurality of buffer protrusions, said buffer protrusions protruding from a top end of said main portion and being configured to abut against said position-limiting member.

3. The biomechanical testing system as claimed in claim 1, wherein said position-limiting member further has a plurality of protruding portions that protrude respectively from said side wall portions into said channel.

4. The biomechanical testing system as claimed in claim 3, wherein said positioning board is adapted for the liquid held in said storage unit to flow therethrough into said airtight space, said upper board being adapted for the excess liquid in said channel to overflow therefrom into said buffer sink.

5. The biomechanical testing system as claimed in claim 4, further comprising a drain pipeline that is connected to said reactor module, and that is adapted for discharging the liquid when in an open state.

6. The biomechanical testing system as claimed in claim 5, further comprising a circulation pipeline that is connected between said reactor module and said storage unit, and at least one pump that is mounted to said circulation pipeline and that is controllable to force the liquid to flow from said reactor module into said storage unit.

7. The biomechanical testing system as claimed in claim 1, wherein said positioning board is adapted for the liquid held in said storage unit to flow therethrough into said airtight space, said upper board being adapted for the excess liquid in said channel to overflow therefrom into said buffer sink.

8. The biomechanical testing system as claimed in claim 7, further comprising a drain pipeline that is connected to said reactor module, and that is adapted for discharging the liquid when in an open state.

9. The biomechanical testing system as claimed in claim 8, further comprising a circulation pipeline that is connected between said reactor module and said storage unit, and at least one pump that is mounted to said circulation pipeline and that is controllable to force the liquid to flow from said reactor module into said storage unit.

10. The biomechanical testing system as claimed in claim 1, wherein:

said reactor module includes one said biological culture material that is tubular, that is positioned in said airtight space by said position-limiting member, and that cooperates with said position-limiting member to divide said airtight space into a channel disposed within said position-limiting member, and an annular outer space disposed outside said position-limiting member and surrounding said channel; and said storage unit includes a container that is adapted to hold the liquid and that is connected fluidly to said pneumatic pressure source, a first pipeline that is connected fluidly to said container and that is in spatial communication with said channel, and a second pipeline that is connected fluidly to said container.

11. The biomechanical testing system as claimed in claim 10, further comprising a drain pipeline that is connected fluidly to said reactor module, and that is adapted for discharging the liquid when in an open state, said position-limiting member having two connecting portions that are inserted into said positioning board and connected to said biological culture material for positioning said biological culture material in said airtight space.

12. The biomechanical testing system as claimed in claim 11, further comprising:

two circulation pipelines that are connected between said storage unit and said drain pipeline, and that are controllable to switch between an open state and a closed state; and two pumps that are mounted respectively to said circulation pipelines and that are controllable to force the liquid to flow from said drain pipeline into said storage unit.

13. The biomechanical testing system as claimed in claim 1, further comprising a gas supply source that is controllable to supply gas to said reactor module.

14. The biomechanical testing system as claimed in claim 1, wherein said upper board has two electrode groups that extend downwardly into said airtight space, each of said electrode groups including a row of pin-shaped electrodes, and being connected to said at least one biological culture material, said electrode groups extending through and being in contact with said at least one biological culture material.

15. The biomechanical testing system as claimed in claim 1, wherein said lower board is operable to heat said airtight space.

16. The biomechanical testing system as claimed in claim 1, further comprising two gaskets that are loop-shaped, one of said gaskets being clamped between said upper board and said positioning board, the other one of said gaskets being clamped between said positioning board and said lower board.

17. The biomechanical testing system as claimed in claim 1, wherein:

said positioning board has an input opening and an output opening that are formed respectively at opposite ends of said positioning board, that are opposite to each other along the first horizontal direction, and that are in fluid communication with said airtight space; and said lower board has a bottom portion that extends in the first horizontal direction, and that has an inlet hole and an outlet hole formed respectively at opposite ends of said bottom portion, and being opposite to each other along the first horizontal direction, and two rib portions that are spaced apart from each other in the second horizontal direction, that protrude from said bottom portion, and that abut against said at least one biological culture material, said bottom portion and said rib portions cooperatively defining an added passage that is in fluid communication with said inlet and outlet holes.

18. The biomechanical testing system as claimed in claim 17, wherein said bottom portion of said lower board further has a connecting surface that extends in the first horizontal direction, and first and second inclined surfaces that are opposite to each other in the first horizontal direction, that are connected respectively to opposite ends of said connecting surface, that are inclined upwardly toward said connecting surface, and that are proximal to said inlet and outlet holes, respectively, said connecting surface and said first and second inclined surfaces being disposed between said rib portions and exposed to said added passage.

19. The biomechanical testing system as claimed in claim 1, wherein said reactor module has an inlet hole and an outlet hole that are formed respectively at opposite ends of said reactor module, that are opposite to each other along the first horizontal direction, and that are in fluid communication with each other, said lower board of said reactor module defining an added passage that extends in the first horizontal direction, and that is in fluid communication with said inlet and outlet holes.

20. The biomechanical testing system as claimed in claim 19, wherein a height of said inlet hole in reference to a bottom end of said reactor module along the vertical direction is different from a height of said outlet hole in reference to said bottom end of said reactor module along the vertical direction.

21. The biomechanical testing system as claimed in claim 1, wherein said lower board has an inlet hole and an outlet hole that are formed respectively at opposite ends of said lower board, and that are opposite to each other along the first horizontal direction, said lower board further having a receiving recess that is recessed from a top surface of said lower board, and that is provided for receiving said position-limiting member, said receiving recess and said position-limiting member cooperatively defining an added passage that is in fluid communication with said inlet and outlet holes.

22. The biomechanical testing system as claimed in claim 1, wherein said position-limiting member has opposite end surfaces that are opposite to each other along the first horizontal direction, at least one of said opposite end surfaces being inclined relative to a bottom end of said position-limiting member.

23. A reactor module comprising:
- an upper board;
- a lower board disposed under said upper board;
- a positioning board disposed between said upper board and said lower board, and surrounding an upright through slot such that said positioning board cooperatives with said upper board and said lower board to define an airtight space;
- a position-limiting member received in said airtight space; and
- at least one biological culture material received in said airtight space and corresponding in position to said position-limiting member;
- wherein said position-limiting member defines a channel that is in spatial communication with said airtight space, and has a main body that extends in a first horizontal direction, and two side wall portions that protrude from said main body in a vertical direction transverse to the first horizontal direction, that extend in parallel in the first horizontal direction, and that are spaced apart from each other in a second horizontal direction transverse to the first horizontal direction and the vertical direction, said side wall portions being disposed on opposite sides of said channel; and
- wherein said position-limiting member further has at least one block portion that is disposed in said channel and connected to said main body, and that has a polygonal prism shape.

24. The reactor module as claimed in claim 23, wherein said at least one biological culture material has a main portion and a plurality of buffer protrusions, said buffer protrusions protruding from a top end of said main portion and being configured to abut against said position-limiting member.

25. The reactor module as claimed in claim 23, wherein said position-limiting member further has a plurality of protruding portions that protrude from said side wall portion into said channel, and that are opposite to each other in the second horizontal direction.

26. The reactor module as claimed in claim 23, comprising one biological culture material that is tube shaped, that is limited in position by said position-limiting member, and that divides said airtight space into a channel, and an annular outer space surrounding said channel.

27. The reactor module as claimed in claim 23, wherein said upper board has two electrode groups that extend downwardly into said airtight space, each of said electrode groups including a row of pin-shaped electrodes, and being connected to said at least one biological culture material, a connection between said electrode groups and said at least one biological culture material being one of press-contact and insertion.

28. The reactor module as claimed in claim 23, wherein said lower board is operable to heat said airtight space.

29. The reactor module as claimed in claim 23, wherein:
- said positioning board has an input opening and an output opening that are formed respectively at opposite ends of said positioning board, that are opposite to each other along the first horizontal direction, and that are in fluid communication with said airtight space; and
- said lower board has
  - a bottom portion that extends in the first horizontal direction, and that has an inlet hole and an outlet hole formed respectively at opposite ends of said bottom portion, and being opposite to each other along the first horizontal direction, and
  - two rib portions that are spaced apart from each other in the second horizontal direction, that protrude from said bottom portion, and that abut against said at least one biological culture material, said bottom portion and said rib portions cooperatively defining an added passage that is in fluid communication with said inlet and outlet holes.

30. The reactor module as claimed in claim 29, wherein said bottom portion of said lower board further has a connecting surface that extends in the first horizontal direction, and first and second inclined surfaces that are opposite to each other in the first horizontal direction, that are connected respectively to opposite ends of said connecting surface, that are inclined upwardly toward said connecting surface, and that are proximal to said inlet and outlet holes, respectively, said connecting surface and said first and second inclined surfaces being disposed between said rib portions and exposed to said added passage.

31. The reactor module as claimed in claim 23, further comprising an inlet hole and an outlet hole that are formed respectively at opposite ends of said reactor module, that are opposite to each other along the first horizontal direction, and that are in fluid communication with each other, said lower board of said reactor module defining an added passage that extends in the first horizontal direction, and that is in fluid communication with said inlet and outlet holes.

32. The reactor module as claimed in claim 31, wherein a height of said inlet hole in reference to a bottom end of said reactor module along the vertical direction is different from a height of said outlet hole in reference to said bottom end of said reactor module along the vertical direction.

33. The reactor module as claimed in claim 23, wherein said lower board has an inlet hole and an outlet hole that are formed respectively at opposite ends of said lower board, and that are opposite to each other along the first horizontal direction, said lower board further having a receiving recess that is recessed from a top surface of said lower board, and that is provided for receiving said position-limiting member, said receiving recess and said position-limiting member cooperatively defining an added passage that is in fluid communication with said inlet and outlet holes.

34. The reactor module as claimed in claim 23, wherein said position-limiting member has opposite end surfaces that are opposite to each other in the first horizontal direction, at least one of said opposite end surfaces being inclined relative to a bottom end of said position-limiting member.

* * * * *